US006023157A

United States Patent [19]

Kazuno

[11] Patent Number: 6,023,157

[45] Date of Patent: Feb. 8, 2000

[54] CONSTANT-CURRENT CIRCUIT FOR LOGIC CIRCUIT IN INTEGRATED SEMICONDUCTOR

[75] Inventor: Masataka Kazuno, Yamanashi-ken, Japan

[73] Assignee: Fujitsu Limited, Kawasaki, Japan

[21] Appl. No.: 08/989,772

[22] Filed: Dec. 12, 1997

[30] Foreign Application Priority Data

Apr. 21, 1997 [JP] Japan .................................... 9-103018

[51] Int. Cl.[7] ................................ G05F 3/16; G05F 1/10; G05F 3/02; H02J 3/38

[52] U.S. Cl. .......................... 323/312; 323/316; 327/530; 327/543

[58] Field of Search .................................... 323/312, 315, 323/313, 314, 316; 327/530, 538, 543

[56] References Cited

U.S. PATENT DOCUMENTS

| | | | |
|---|---|---|---|
| 4,150,309 | 4/1979 | Tokuda | 307/310 |
| 4,282,477 | 8/1981 | Ahmed | 323/312 |
| 4,507,600 | 3/1985 | Okayama | 323/312 |
| 5,422,563 | 6/1995 | Pflueger | 323/313 |
| 5,512,855 | 4/1996 | Kimura | 327/538 |
| 5,587,655 | 12/1996 | Oyabe et al. | 323/312 |
| 5,627,461 | 5/1997 | Kimura | 323/312 |
| 5,818,211 | 10/1998 | Narusawa et al. | 323/312 |

*Primary Examiner*—Peter S. Wong
*Assistant Examiner*—Bao Q. Vu
*Attorney, Agent, or Firm*—Armstrong, Westerman, Hattori, McLeland & Naughton

[57] ABSTRACT

According to the present invention, a first voltage is generated at a drain of a first MESFET by a first stage circuit that includes a plurality of diode elements and the first MESFET with its gate and drain connected together provided between power sources. The first voltage is applied to a gate of a second MESFET that performs a source follower operation so that a constant second voltage, which is lower by the equivalent of a threshold voltage than the first voltage, is generated at the source. A third MESFET with a diode connection is provided between the second voltage source and a lower power source, and a bias voltage is generated at the drain terminal of the third MESFET. The bias voltage is supplied to the gate of a constant-current transistor, the source of which is connected to the lower power source. The current of the constant-current transistor is supplied to an SCFL circuit, the source of which is connected for common use.

5 Claims, 3 Drawing Sheets

CONSTANT-CURRENT CIRCUIT FOR LOGIC CIRCUIT IN INTEGRATED SEMICONDUCTOR

BACKGROUND OF THE INVENTION

The present invention relates to a constant-current circuit, and in particular to a constant-current circuit which is employed for a logic circuit of FET formed on a substrate, such as a GaAs substrate, and which is little affected by differences in the characteristics of a device and by power voltage fluctuations.

Since an MESFET (Metal Semiconductor Field Effect Transistor) formed on a GaAs semiconductor substrate has a faster operation speed, a higher frequency characteristic and a lower power consumption than an MOS transistor employing a silicon semiconductor substrate, attention is focused on the MESFET as a device constituting an LSI to be used for fast signal processing in a communication system. A representative logic circuit is an SCFL (Source Coupled FET Logic) wherein FET source terminals are connected in common and a constant-current source is connected between the commonly connected source terminals and a lower power voltage side, a load being connected between a drain terminal and a power voltage terminal. This logic circuit is similar to an ECL (Emitter Coupled Logic) circuit which employs a bipolar transistor formed on a silicon substrate, and a combination of the two logic circuits is frequently employed.

Recently, there have been instances where an SCFL circuit has been employed together with a CMOS circuit using silicon.

FIG. 4 is a circuit diagram illustrating a conventional constant-current circuit. This example shows a constant-current circuit constituting a constant-current source for the above SCFL circuit. In the SCFL circuit, source terminals of transistors $Q_{10}$ and $Q_{12}$ are connected in common, loads $R_{10}$ and $R_{12}$ are connected between the their drains and power supply voltage $V_{DD}$, and a transistor $Q_{14}$ is connected as a constant-current device between a ground power supply voltage and the common source terminal. Input signals IN and /IN having opposite phases are transmitted to the gates of the transistors $Q_{10}$ and $Q_{12}$, and in accordance with the level, H or L, of the input signals, output signals are generated at output OUT and /OUT. When current $I_B$ is set to a constant-current, a level lower by $R_{10}\times I_B$ than power voltage $V_{DD}$ can be set as a fixed level L for the output signal.

In the prior art, the constant-current circuit is constituted by the transistor $Q_{14}$ and resistors $R_1$ and $R_2$ connected between the power voltage source and the ground. A bias voltage $V_B$ divided by the resistors $R_1$ and $R_2$ is applied to the gate terminal of the transistor $Q_{14}$. When the bias voltage $V_B$ has a constant potential, the voltage between the gate and the source of the transistor $Q_{14}$ is constant and current $I_B$ serves as a constant-current In the constant-current circuit shown in FIG. 4, however, a constant current $I_B$ can not be produced because of variations in the power supply voltage $V_{DD}$, the characteristic differences of the resistors and the threshold voltages for the transistors, and characteristic differences which accompany temperature changes.

FIG. 5 is a graph showing the relationship between a current $I_o$ flowing in the circuit comprising the resistors $R_1$ and $R_2$ and the bias voltage source $V_B$. Since the bias voltage $V_B$ is determined from a product of the resistance $R_2$ and the current $I_o$, the relational equation is $$I_o=V_B/R_2.$$

And since a differential voltage between the power supply voltage $V_{DD}$ and the bias voltage $V_B$ is applied to the resistor $R_1$, and the current $I_o$ flows across it, the load characteristic is $$I_o=-V_B/R_1+V_{DD}/R_1.$$

The above relationship is shown in FIG. 5. The solid line represents the characteristics of the resistor $R_2$, and the broken lines and the chained lines represent the characteristics of the resistor $R_1$. The intersections of the several characteristic lines are operation points.

As the power supply voltage $V_{DD}$ changes, the load characteristic is changed to the right or to the left, as is indicted by the broken lines. In addition, the resistance of the resistor $R_1$ is varied due to manufacturing variances and temperature changes, and the load characteristic is changed as is indicated by the chained line. As a result, the operation points are also changed, and there is a great voltage change $\Delta V_B$ in the bias voltage $V_B$. The fluctuation of the bias voltage $V_B$ changes the voltage between the gate and the source of the transistor $Q_{14}$ and induces the fluctuation of the current $I_B$ of the constant-current source.

Further, when the threshold voltage of the transistor is changed due to a manufacturing variance, even though the bias voltage $V_B$ is constant, the drain current $I_B$ flowing through the transistor $Q_{14}$ is changed.

Generally, an MESFET using a GaAs substrate is so designed that a Schottky diode comprising a metal gate electrode is formed on an active layer deposited on the surface of the GaAs substrate, and employs, for its basic operation, the control of a depletion region in the active layer by controlling a gate voltage applied to the gate electrode. In order to provide a certain constant thickness for the active layer under the gate electrode, a process for forming a groove is performed in an area in which the gate electrode is to be formed. Thus, variations in the threshold voltage of a transistor, accompanied by manufacturing variances, can not be avoided. In addition, the characteristics of a resistor element formed on the GaAs substrate differs depending on the quantity and the depth of an ion implantation. It is also well known that temperature changes can delicately vary the characteristics of the resistor element.

As is described above, changes in the power voltage and differences in the characteristics of an element are problems that can not be avoided, and the formation of a constant-current source is desired which operates under such a condition.

SUMMARY OF THE INVENTION

To overcome the above shortcoming, it is one object of the present invention to provide a constant-current circuit which is not affected by power voltage variations, differences in the characteristics of an element, and temperature changes.

It is another object of the present invention to provide a logic circuit having a constant-current circuit which is not affected by variations in a power voltage, differences in the characteristics of an element and temperature changes.

According to the present invention, a first voltage is generated at a drain of a first MESFET by a first stage circuit that includes a plurality of diode elements and the first MESFET with its gate and drain connected together provided between power sources. The first voltage is applied to a gate of a second MESFET that performs a source follower operation so that a constant second voltage, which is lower by the equivalent of a threshold voltage than the first voltage, is generated at the source. A third MESFET with a diode connection is provided between the second voltage source and a lower power source, and a bias voltage is generated at the drain terminal of the third MESFET. The bias voltage is supplied to the gate of a constant-current transistor, the source of which is connected to the lower power source. The current of the constant-current transistor is supplied to an SCFL circuit, the source of which is connected for common use.

The first stage circuit is not affected by variations in a power voltage, and the first and the second MESFETs offset the variations of a threshold voltage. As a result, the second voltage is a constant voltage which is not affected by the variations in the power voltage and differences in the transistor characteristics. The resistor and the third MESFET circuit are not affected by the differences in resistances because of the characteristics of the third MESFET that is connected as a diode. In addition, the third MESFET and the constant-current transistor constitute a current mirror circuit.

To achieve the above object, according to the present invention, provided is a constant-current circuit, for an integrated semiconductor circuit for which are provided a first power source and a second power source lower than said first power source, comprising:

a constant-current transistor, to a source of which said second power source is connected and to a gate of which a bias voltage is applied, for supplying a constant-current;

a first stage circuit, including a plurality of diode elements, which are provided between said first power source and said second power source, and a first MESFET transistor with connected gate and drain, which is inserted into said plurality of diode elements, for generating a first voltage at a drain of said first MESFET;

a second MESFET transistor, to a gate of which said first voltage is applied, for generating a second voltage lower by the equivalent of a threshold voltage value than said first voltage; and a bias voltage generator, including a resistor and a third transistor with connected gate and drain, which are provided between a source of said second MESFET transistor and said second power source, for generating said bias voltage at said gate of said third MESFET transistor.

DETAILED DESCRIPTION OF THE PREFERRED EMBODIMENT

The preferred embodiment of the present invention will now be described while referring to the accompanying drawings. Note, however, that the technical scope of the present invention is not limited to this embodiment.

Figure 1:
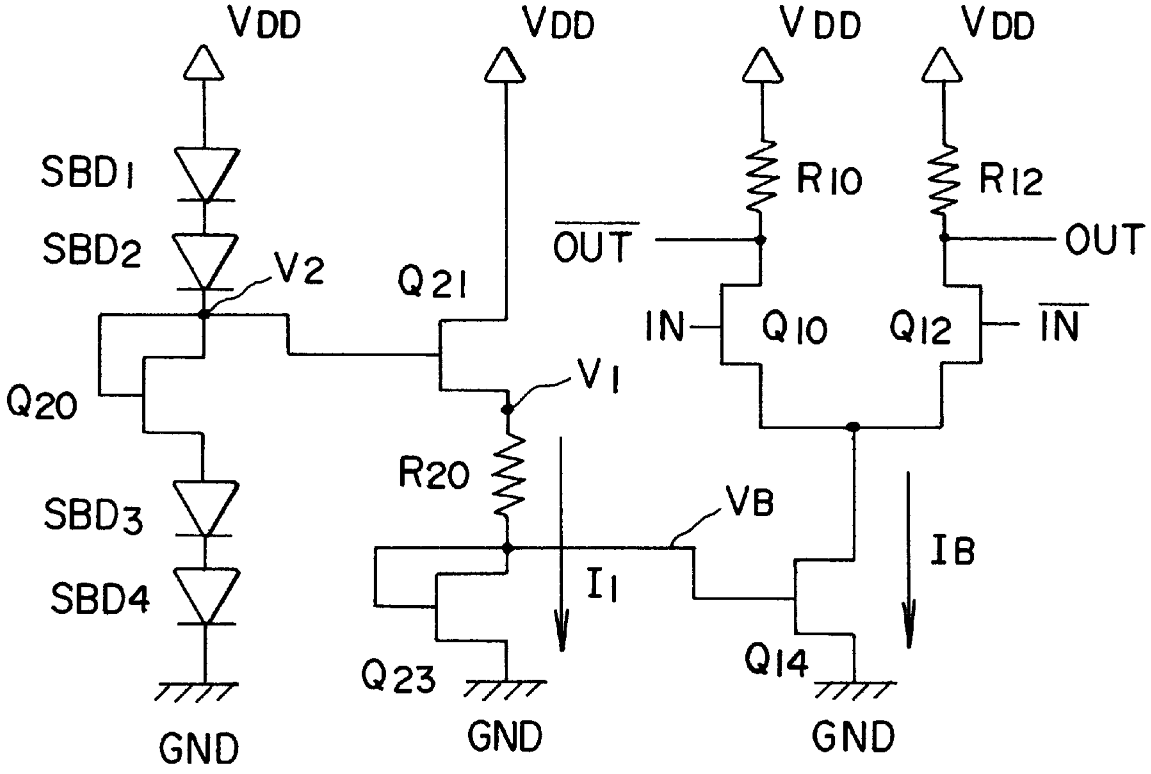
FIG. 1 is a diagram illustrating an SCFL circuit having a constant-current circuit according to an embodiment of the present invention.
Figure 4:
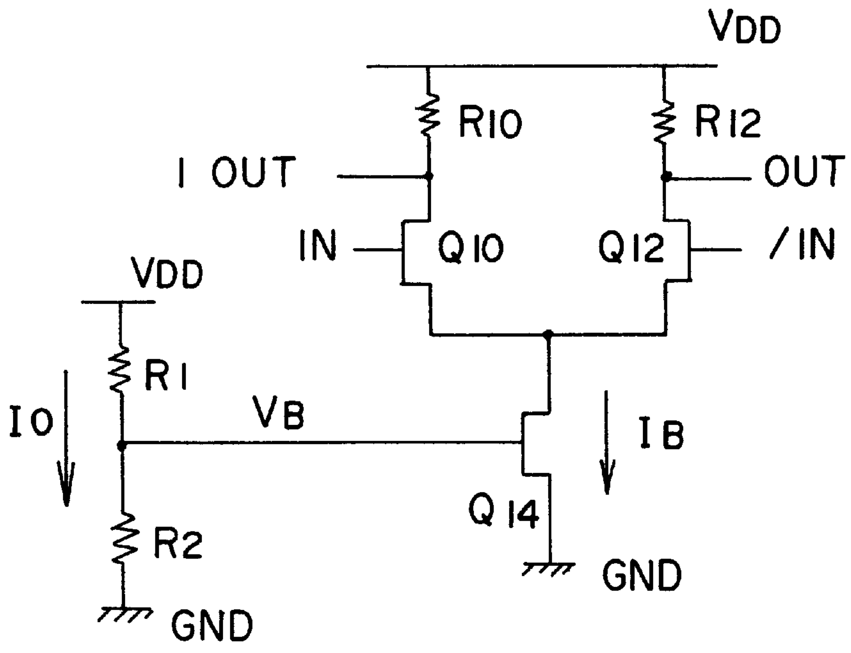
FIG. 4 PRIOR ART
FIG. 4 is a diagram illustrating a conventional constant-current circuit.

FIG. 1 is a diagram illustrating an SCFL circuit having a constant-current circuit according to an embodiment of the present invention. In this embodiment, a constant-current circuit is shown for generating a constant current $I_B$ for a common SCFL circuit in FIG. 4.

As is described above, in the SCFL circuit, transistors $Q_{10}$ and $Q_{12}$ and load resistors $R_{10}$and $R_{12}$ are connected as indicated in FIG. 1, a transistor $Q_{14}$ being commonly connected as a constant-current element between the sources of the transistors $Q_{10}$ and $Q_{12}$ and ground GND.

The constant-current circuit in FIG. 1 comprises a first stage circuit, which includes a plurality of Schottky diodes $SBD_1$ to $SBD_4$ and a transistor $Q_{20}$ connected as diode, which are connected between a power voltage source $V_{DD}$ and the ground GND; and a bias voltage generation circuit, which includes a source follower transistor $Q_{21}$ with a gate to which a voltage $V_2$ generated by the first stage circuit is supplied, a resistor $R_{20}$, a transistor $Q_{23}$ and the transistor $Q_{14}$ serving as a constant-current element. Together, the transistors $Q_{23}$ and $Q_{14}$ form a current mirror circuit. The transistors of this constant-current circuit are enhancement type MESFETs.

Figure 2:
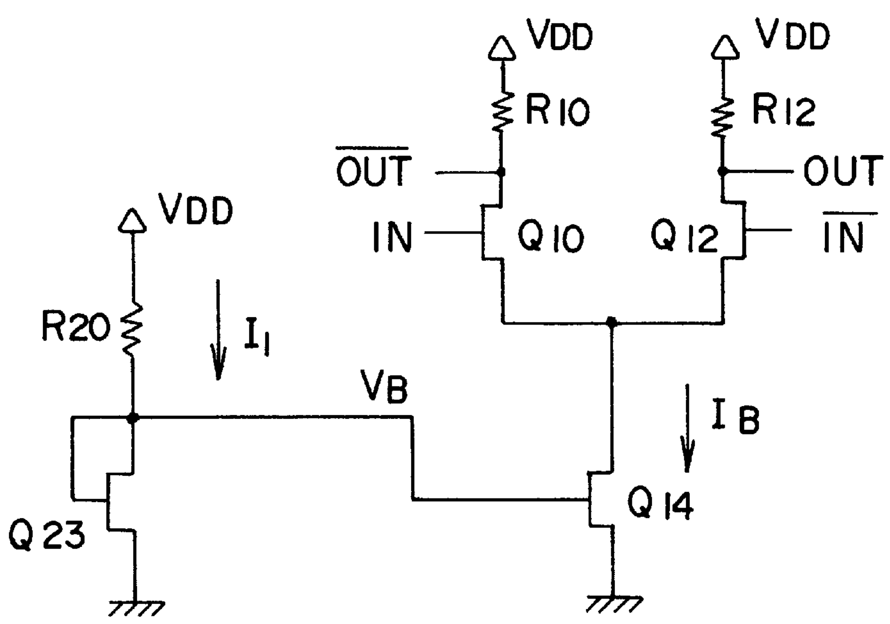
FIG. 2 is a circuit diagram for explaining the principle of the constant-current circuit shown in FIG. 1.

To explain the principle of the constant-current circuit, an explanation will now be given for the operation of a circuit including the resistor $R_{20}$ the transistor $Q_{23}$ and the transistor $Q_{14}$, which is a constant-current element. FIG. 2 is a diagram of this circuit in which the same reference numerals are also used to corresponding or identical components as are used in FIG. 1, except for the power supply voltage $V_{DD}$ connected to the resistor $R_{20}$.

Figure 3:
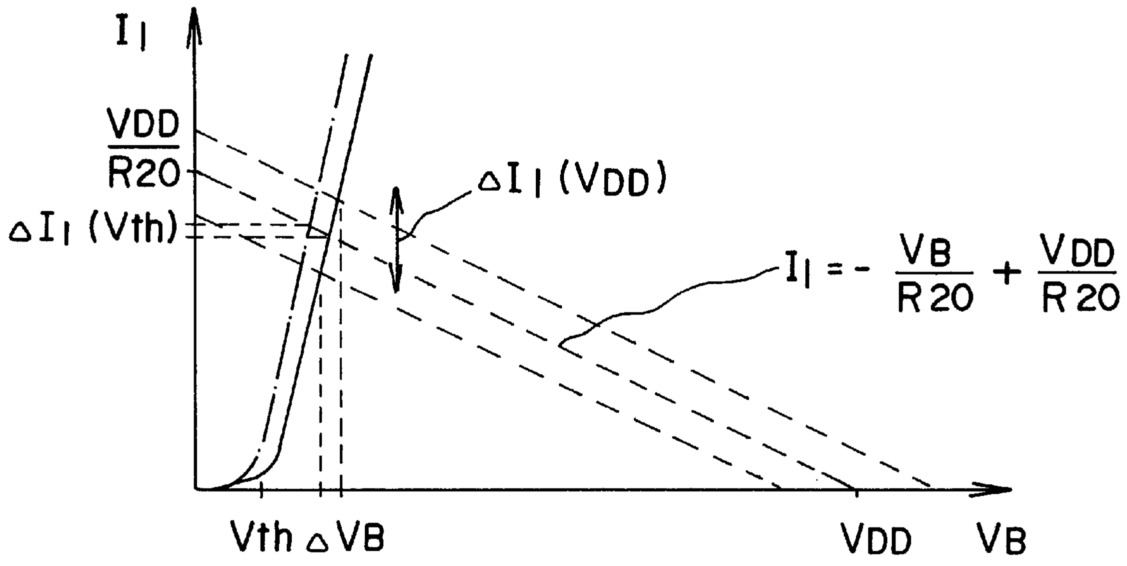
FIG. 3 is a graph showing a relationship between a bias voltage $V_B$ and a current $I_1$ in a circuit including a resistor R20 and a transistor $Q_{23}$ in FIG. 2.

The circuit in FIG. 2 can generate constant current $I_B$ that is not affected by changes in the power voltage $V_{DD}$. FIG.3 is a graph showing a relationship between the bias voltage $V_3$ and the current $I_1$ in the circuit in FIG. 2, which includes the resistor $R_{20}$ and the transistor $Q_{23}$. The operational characteristic of the transistor $Q_{23}$ is represented by the solid lines and the load characteristic of the resistor $R_{20}$ is represented by the broken line. Since the gate and the drain of the transistor $Q_{23}$ are connected together, substantially, the transistor $Q_{23}$ has a diode characteristic in that the threshold voltage of the transistor is employed as a forward voltage. The load resistor $R_{20}$ has the characteristic $(V_{DD}-V_B)=I_1\times R_{20}$. Intersections of the characteristic lines indicate the operation points of the circuit.

Figure 5:
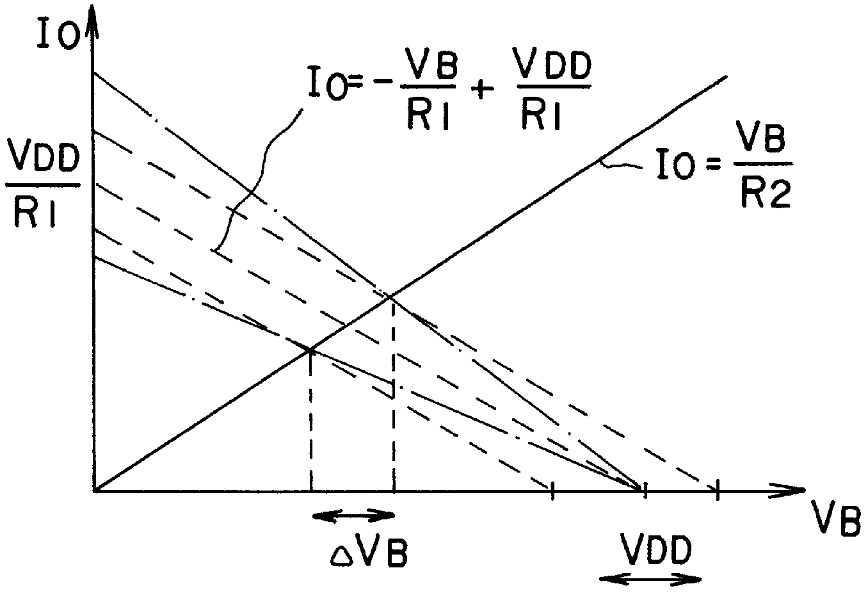
FIG. 5 PRIOR ART
FIG. 5 is a graph showing a relationship between a current $I_o$, which flows through a circuit including resistors $R_1$ and $R_2$ in FIG. 4, and a bias voltage $V_B$.

This circuit employs the diode characteristic of the transistor $Q_{23}$ to maintain a quite small magnitude of change $\Delta V_B$ in the bias voltage $V_B$, relative to the changes in the power voltage $V_{DD}$. Because of the diode characteristic of the transistor $Q_{23}$, even when the inclination $V_B$–$I_1$ is increased and the power voltage $V_{DD}$ fluctuates, as is indicated by the broken lines, the change AVB of the corresponding bias voltage $V_B$ is smaller than that of the prior art in FIG. 5. In addition, the same thing can be said concerning the differences in the characteristic of the resistor $R_{20}$.

This circuit is so designed that it is seldom affected by differences in the threshold voltage of the transistor, which are caused by manufacturing variances and temperature changes. Assuming that the threshold voltage Vth of the transistor $Q_{23}$ is lowered, the characteristic curve of the transistor $Q_{23}$ is shifted to the left, as is indicated by the chained line. However, the threshold voltage vth of the transistor $Q_{23}$ is at most 0.2 to 0.3, which is smaller than the power voltage $V_{DD}$ of, for example, 3 V. Therefore, even when the threshold voltage Vth is changed, there is almost no change in a voltage ($V_{DD}-V_B$) to be applied to the load resistor $R_{20}$. Accordingly, change $\Delta I_1$ for the current $I_1$ does not constitute a great change. Since the transistors $Q_{23}$ and $Q_{14}$ constitute the current mirror circuit, the currents $I_1$ and $I_B$ are controlled and maintain a constant ratio according to the sizes of the two transistors. As a result, there is only a slight change in the current $I_B$ and in the current $I_1$. Because the greater the resistance $R_{20}$ is the smaller the inclination of the load characteristic curve (broken line) in FIG. 3 becomes, it is understood that the trend toward the small change in the current $I_1$ and $I_B$ will be more apparent.

With the circuit arrangement shown in FIG. 2, it is possible to provide a constant-current circuit which is seldom affected by differences in the characteristics of the transistor. As a result, it is also necessary for the circuit to be little affected by changes in the power supply voltage $V_{DD}$.

The constant-current circuit in FIG. 1 is so designed that a constant voltage $V_1$, which is held constant without being affected by changes in a power supply voltage and differences in the characteristic of elements, can be provided for the power supply voltage $V_{DD}$ in the circuit in FIG. 2. The first stage circuit, which includes the diodes $SBD_1$ to $SBD_4$ and the transistor $Q_{20}$, which is connected as diode, generates voltage $V_2$ which is little affected by changes in the power supply voltage $V_{DD}$. In this embodiment, the diodes $SBD_1$ to $SBD_4$ are constituted by Schottky barrier diodes formed between a GaAs semiconductor substrate and a metal gate formed thereon. The forward bias voltage, for example, is approximately 0.6 V, and the threshold voltage of the transistor $Q_{23}$ connected as diode is 0.2 to 0.3 V, as was preciously described. Therefore, even when the power supply voltage $V_{DD}$ is 3 V, a voltage equal to or greater than ON voltages for the five diodes is supplied to the diodes, all of which are thereby rendered conductive. As a result, the voltage $V_2$ is $2V_{SBD}$+Vth from the ground potential. Since the first stage circuit is operated as one type of a clamp circuit, the voltage $V_2$ is $2V_{SBD}$+Vth, even though the power supply voltage $V_{DD}$ fluctuates.

Generally, since the ON voltage $V_{SBD}$ of the Schottky barrier diodes is uniformly determined by an interface band gap between a semiconductor and metal, substantially, it is not affected at all from a manufacturing variances. Or, even for a diode formed by a PN junction, a manufacturing variance is small so long as there is no variance in an impurity density on the interface. Therefore, of the voltages represented in $V_2=2V_{SBD}$+Vth, only the threshold voltage Vth of the transistor is greatly influenced by a manufacturing process.

The voltage $V_2$ is applied to the gate of the transistor $Q_{21}$, and a voltage $V_1$ is generated at its source terminal. It is well known that the transistor $Q_{21}$ serves as a source follower and the voltage at the source terminal follows the voltage at the gate. In other words, the voltage $V_1$ at the source terminal follows the voltage $V_2$ at the gate, while the voltage $V_1$ is lower by the equivalent of the threshold voltage Vth than the voltage $V_2$. In addition, the power supply voltage $V_{DD}$ is applied to the drain terminal of the transistor $Q_{21}$ which is operated in a saturated characteristic region. This means that, if the voltage between the gate and the source is constant, the drain current $I_d=I_1$ remains constant without depending on the power voltage $V_{DD}$).

Consider, then, a case where the threshold voltage Vth of the transistor is changed due to a manufacturing variance. As is described above, voltage $V_2=2V_{SBD}$+Vth ($Q_{20}$), and voltage $V_1$ is:

$$V_1=2V_{SBD}+\text{Vth }(Q_{20})-\text{Vth }(Q_{21}).$$

Since the changes in the characteristics of the transistors $Q_{20}$ and $Q_{21}$ formed on the same substrate follow the same trend, it is obvious that the changes in the threshold voltages Vth of the transistors are offset each other.

Consequently, the voltage $V_1$ is a constant voltage that is not affected by changes in the power supply voltage $V_{DD}$ and changes in the characteristics of the transistors. As is indicated as the characteristics of the circuit in FIG. 3 which includes the resistor $R_{20}$ and the transistor $Q_{23}$, the load characteristics indicated by the broken lines do not fluctuate and changes in the bias voltage $V_B$ are restricted. As a result, the changes in the bias voltage $V_B$, which occur because of changes in the voltage $V_1$, and changes in the gate-source voltage of the transistor $Q_{14}$ are limited, so that the current $I_B$ becomes constant.

As is described above, the constant-current circuit shown in FIG. 1 can produce the constant current $I_B$, which limits the influence of changes in the power supply voltage $V_{DD}$ and of variations in the characteristics of the elements caused by manufacturing variances and temperatures.

Although in the above embodiment four Schottky barrier diodes are employed for the first stage circuit, the number of diodes used is not limited to four, and a desired number of diodes is selected in accordance with a voltage applied by the power supply voltage $V_{DD}$. It is desirable that the total of the ON voltages of all the diodes be lower than the power supply voltage $V_{DD}$ . In addition, the number of diodes which are provided upper or lower than the node of the voltage $V_2$ can be selected as desired as well. Furthermore, the bias voltage $V_B$ can be supplied to a plurality of constant-current source transistors.

Even in case where the power supply voltage having a higher voltage is a ground source, and the power supply voltage having a lower voltage is a negative voltage, the above constant-current circuit can generate a constant current in the same manner. In this case, although changes in the voltage of the lower power supply tend to occur, the voltage at the source terminal of the transistor $Q_{14}$ is also changed, so that it can be regarded simply as a shift of the power supply voltage to the negative side.

As is described above, according to the present invention, it is possible for a MESFET logic circuit to provide a constant-current circuit which is seldom affected by changes in power supply voltages and changes in the element characteristics caused by manufacturing variances and temperature changes.

What is claimed is:

1. A constant-current circuit, for an integrated semiconductor circuit for which are provided a first power source and a second power source lower than said first power source, comprising:

a constant-current transistor, to a source of which said second power source is connected and to a gate of which a bias voltage is applied, for supplying a constant-current;

a first stage circuit, including a plurality of diode elements, which are provided between said first power source and said second power source, and a first MESFET transistor with connected gate and drain, which is inserted into said plurality of diode elements, for generating a first voltage at a drain of said first MESFET;

a second MESFET transistor, to a gate of which said first voltage is applied, for generating a second voltage lower by the equivalent of a threshold voltage thereof than said first voltage; and a bias voltage generator, including a resistor and a third transistor with connected gate and drain, which are provided between a source of said second MESFET transistor and said second power source, for generating said bias voltage at said gate of said third MESFET transistor.

2. A semiconductor integrated circuit according to claim 1, wherein a logic circuit having at least a pair of transistors with sources connected in common is formed between a drain of said constant-current transistor and said first power source.

3. A constant-current circuit according to claim 1, wherein the total of ON voltages of said diode elements and said first MESFET in said first stage circuit is smaller than a difference in voltages between said first and said second power sources.

4. A constant-current circuit according to claim 1, wherein said first, said second and said third MESFET transistors are enhancement type MESFETs.

5. A constant-current circuit according to claim 1, wherein said diode elements are Schottky barrier diodes.

* * * * *